Patented Mar. 13, 1945

2,371,237

UNITED STATES PATENT OFFICE 2,371,237

ALUMINA GEL CATALYSIS

Llewellyn Heard, Hammond, Ind., and Rodney V. Shankland and James C. Bailie, Chicago, Ill., assignors to Standard Oil Company, Chicago, Ill., a corporation of Indiana No Drawing. Application August 7, 1942, Serial No. 454,018

10 Claims. (Cl. 196—52)

This invention relates to improved methods of making and using alumina gel catalysts and it pertains more particularly to catalysts for hydrocarbon conversion processes such as hydroforming, aromatization, dehydrogenation, etc., although many features of the invention may also be applicable to catalysts for cracking, alkylation, dealkylation, hydrogenation, polymerization and other conversion processes.

An object of the invention is to provide an improved method of manufacturing a gel-type alumina catalyst on a commercial scale. Alumina has long been a common catalyst and catalyst support in hydrocarbon conversion processes and an enormous amount of research has been expended on the manufacture of gel-type alumina catalysts, yet no catalyst of this type heretofore known to the art has been entirely satisfactory for hydrocarbon conversion processes. Thus catalysts which effected substantial conversions failed to give the desired product distributions, catalysts which produced large product yields failed to give the desired product quality, catalysts which gave both yields and quality tended toward undue coke deposition or gradually lost their activity. Catalysts showing great promise in laboratory experiments were unsuitable for commercial use because they lacked the necessary physical strength and could not be employed in large beds without packing and thereby causing undue pressure drops in the system, channeling, etc. An object of our invention is to provide a catalyst of substantial physical strength which can be used in large beds without causing undue pressure drop, short-circuiting, etc., a catalyst which will produce maximum yields of high quality conversion products with minimum deposits of coke and carbonaceous material and a catalyst which is more suitable for the hydroforming or aromatization of naphtha than any catalyst heretofore known to the art.

A further object of our invention is to define the optimum method of making a gel-type alumina catalyst and the optimum conditions to be employed in each step of said method. Numerous methods of making gel-type alumina catalysts are known to the art but none of these prior methods results in a product which satisfactorily meets all the requirements of a hydrocarbon conversion process such as hydroforming or dehydroaromatization. An object of our invention is to provide an improved process for making superior hydroforming or dehydroaromatization catalysts which are characterized by the production of larger yields of a given octane number product, larger octane number of a given yield of product and less coke for a given octane number or product yield than in the case of any previously known catalyst of this type.

Another object is to provide an improved combination of procedural steps, each carried out under critically defined conditions, for producing and reproducing an alumina catalyst structure superior to any alumina catalyst structure heretofore known to the art.

Minute amounts of impurities in hydrocarbon conversion catalyst may have a profound effect on catalyst structure and catalyst activity; a further object of our invention is to avoid any amounts of such impurities which might have a detrimental effect on catalyst structure, catalyst activity, or catalyst life. A further object is to provide an improved method and means for combining our improved gel-type alumina catalyst material with other catalyst materials, promoters and the like. A further object is to provide an improved catalyst in pelleted form which will be characterized by great rigidity and strength while retaining the valuable properties of granulated catalyst particles.

A further object is to obtain larger yields of desired conversion products than has heretofore been possible from given charging stocks in hydrocarbon conversion processes. Other objects will be apparent as the detailed description of our invention proceeds.

In practicing our invention we prefer to use pure metallic aluminum instead of aluminum salts or other aluminum compounds as a source of the aluminum, not only because of the difficulty and expense of obtaining such salts or compounds of the required purity but also because our "metallic aluminum" process results in a gel structure which is phenomenally advantageous for hydrocarbon conversion processes. However, many features of our invention may be retained even when the aluminum is supplied to the system in the form of salts or other compounds. Sodium aluminate is objectionable because of the practical impossibility of removing the last traces of sodium from the system. Strong acids such as hydrochloric and sulfuric are undesirable not only because of the difficulty in handling such materials, corrosion of equipment, etc., but because they do not give the desired catalyst properties or gel structure.

The general type of reaction employed in our process may be substantially as follows:

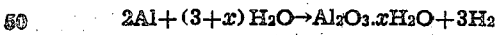

$$2Al + (3+x)H_2O \rightarrow Al_2O_3 \cdot xH_2O + 3H_2$$

The reaction is effected by using amalgamated aluminum and hot water with formic acid (or in some cases with acetic acid) as a peptizing medium. For obtaining the desired $Al_2O_3 \cdot xH_2O$ sol it is essential to control within fairly critical limits the variables such as time, temperature, concentrations of reactants, amount of acid present, etc. To this sol we add a catalyst component in the form of an electrolyte which expedites the conversion of the sol to a vibrant gel or jelly.

Then, in successive and independent steps we carefully (1) dry, (2) heat treat, preferably in an inert or low-oxygen atmosphere, and (3) ignite, each of these steps being effected under carefully controlled temperature conditions and for definite periods of time which have been found essential for optimum results. The ignited gel is then cooled, crushed to optimum size for pelleting and pelleted with a particular type of binder to give the final catalyst material.

The first step in the manufacture of the catalyst is the production of a concentrated alumina sol. In this step we make up a dilute solution of formic acid or acetic acid in distilled or pure water and dissolve in this solution a small amount of a mercury salt. The initial acid solution should be of a concentration of the order of about ½ to 1% although initial concentrations of 2% or more may be employed when the acid used, the temperature employed, the amount of mercury present and the nature of the added metallic aluminum is such that the reaction will not proceed too vigorously. We prefer to employ about ½ to 1 part by weight of a mercury salt to 300 parts by weight of the dilute acid solution. The mercury may be added in the form of mercuric oxide and dissolved in the formic or acetic acid solution but it is preferably added in the form of a mercuric nitrate solution (about 2½ parts by weight of $Hg(NO_3)_2$ per part of water) so that the metallic mercury recovered from the process may be readily dissolved with concentrated, i. e. at least about 50% nitric acid and recycled to the system.

This dilute formic or acetic acid solution containing a small amount of a soluble mercury salt is heated to a temperature within the approximate range of 160 to 200° F. in a reaction tank which may be lined with glass or stoneware or which may even be a wooden vessel but which should not permit the contact of the reactants with metallic surfaces or other surfaces which might introduce impurities into the reaction mixture. The reaction vessel is preferably provided with a reflux condenser and it may also be provided with heating and cooling coils all of which should likewise be of such design and material as to prevent any contamination of the reactants. The reaction tank should be provided with a high speed mechanical stirrer of Monel metal or coated with glass or enamel. To about 300 parts of this dilute formic or acetic acid solution we add about 10 parts or more by weight of metallic aluminum in the form of pieces of thin sheet metal, in granular form, or in the form of aluminum billets, the particular form being relatively unimportant but it being important to use aluminum of as high a degree of purity as is commercially feasible. We prefer to employ aluminum of at least 99½% purity. An excess of aluminum may be employed since it can be settled out of the sol at the end of the reaction and employed for making the next batch of sol.

On the addition of the aluminum a vigorous reaction ensues with liberation of hydrogen and an increase in temperature. A certain amount of foaming and frothing will likewise occur particularly when the reaction is effected in a wooden vessel. The foaming may be controlled by the addition of high molecular weight alcohols such as octyl alcohol but we prefer to avoid the use of such foam breakers because of their tendency to form a premature setting of the gel. Acetic acid solutions produce a heavier froth than formic acid solutions and we have found that the reaction may be carried out more quickly and with less frothing difficulty when employing formic acid as the peptizing agent. The rapid mechanical stirring is continued without any further additions of acid until the reaction has visibly slowed down which may be a matter of about 1 to 5, for example 3, hours. When the reaction has visibly slowed down an additional amount of the formic acid or acetic acid is added while the rapid mechanical stirring is maintained. The acid may be added continuously as a regulated stream or it may be added in a plurality of batches or dumps. The rate at which acid is added is determined by the rate of reaction—the temperature should be maintained below the boiling point of the solution and water and acid vapors should be knocked back to the system by means of the reflux condenser with care being taken to prevent too rapid a liberation of hydrogen with its accompanying frothing. In the case of formic acid we continue the acid addition until the final concentration is within the approximate range of 2 to 9%, preferably 3 to 6%. In the case of acetic acid we continue the addition until the acid concentration is within the approximate range of 1½ to 6%, preferably 2 to 3%. After all of the acid has been added the mechanical stirring is continued and the solution is maintained at the high temperature for a period of several hours usually about 5 to 10 hours or until the alumina concentration in the resulting sol is of the order of about 5 to 6%. For many reasons it is essential that the alumina concentration in the sol be at least about 3% but it is commercially impractical to obtain sols having an alumina concentration greater than about 8 to 10% and we have found that generally speaking the optimum alumina concentration in the sol is about 5 to 6% by weight. In determining the concentration of alumina in the sol at this stage by evaporating a weighed sample to dryness and igniting, the final weighing must be carried out very quickly since the resulting gel is far more hygroscopic than ordinary alumina gels.

When the sol has been stirred at the high temperature substantially about 160° F. with the amounts of acid and in the manner hereinabove described for a sufficient period of time to produce a sol containing about 5 to 6% of alumina, the stirring is discontinued and the mercury and undissolved aluminum are allowed to settle out. This settling may require an hour or so. The settled mercury may be withdrawn, redissolved in 50% nitric acid and returned for use in making another batch of the sol. Any undissolved aluminum may likewise be transferred to another batch. The remaining sol contains so much alumina that it will set into a vibrant gel if it is allowed to stand and it is, therefore, desirable to transfer the sol to trays or to a drying system rather promptly.

An outstanding advantage of the formic acid sol is the fact that it is less viscous than the acetic acid sol in the first place, that it is transformed into the vibrant gel stage through a gradual transition period (rather than by abrupt gelation) and that after it has partially set to a gel it may be returned to the sol state by vigorous mechanical stirring. The system should, of course, be designed to prevent transfer lines from becoming plugged with solid gel. If a tank of the acetic acid sol sets into a gel before it is transferred to the drying pans or the drying system it will be necessary to "dig out" the resulting gel. However, the formic acid gel may be reconverted to a sol by use of the high speed mechanical mixer.

A secondary catalyst material or promoter preferably in the form of an aqueous electrolyte may be intimately dispersed in the alumina sol immediately before it is converted into a gel and gelation may in fact be expedited by the use of such catalyst material or electrolyte solution. (As described in United States Patent No. 2,274,634.) In our preferred example we add a concentrated or substantially saturated aqueous solution of ammonium molybdate

$$(NH_4)_6Mo_7O_{24}\cdot 4H_2O)$$

in such amounts as to incorporate about 3 to 15%, preferably about 9%, of $MoO_3$ in the final catalyst, assuming said catalyst to be a mixture of $Al_2O_3$ and $MoO_3$. The ammonium molybdate solution is added to the alumina sol with rapid stirring immediately before the sol is introduced into trays or onto a belt or drum for gelation and drying. To prevent gelation of a large body of catalyst material in a mixing tank we prefer to pass a stream of the sol through one line and a stream of the saturated ammonium molybdate through another line, through a mixing chamber or high speed mechanical mixer and to discharge the catalyst sol mixture directly onto the surfaces on which gelation and drying are to be effected. Since the electrolyte may cause gelation in a matter of seconds, this mixing technique is of great importance. The resulting gel after drying, heat treating and calcining is a highly superior catalyst for producing large yields of extremely high octane number motor fuel from naphtha charging stocks and it is characterized by an extremely low tendency toward carbon deposition, a remarkably long catalyst life, great stability when subjected to high temperatures for long periods of time, etc.

While molybdena is the outstanding catalyst for aromatization it should be understood that other catalyst material may be employed instead of ammonium molybdate. For aromatization examples of other catalyst materials include slurries or aqueous solutions of oxides or decomposable compounds of such elements as molybdenum, chromium, tungsten, vanadium, or any other metal of known catalytic effect.

An outstanding feature of our invention is the preparation and use of an alumina sol containing about 5 to 6% of alumina or at least having an alumina content within the approximate range of 3 to 8%. Such alumina sols do not require the addition of electrolytes for effecting gelation, although electrolytes expedite gelation and insure gelation before the beginning of the drying step. Drying is not employed for effecting gelation and in fact we prefer to have the sol converted into a vibrant gel before the beginning of the drying step in order to insure the production of a gel structure of desired physical and catalytic properties. The sol may be introduced in thin layers less than 1 inch in thickness, preferably less than ¼ inch in thickness and for example ⅛ inch in thickness, onto flat shallow aluminum drying pans, onto a moving belt or onto a large rotating drum. Gelation takes place almost instantaneously, the sol adhering to the metal surface in the form of vibrant gel or jelly. If the sol were sprayed into a drying tower there might be undesirable dehydration before gelation or lack of control of proper drying conditions. We, therefore, prefer gelation in the form of thin sheets and the subsequent drying of the sheets of vibrant gel.

An important feature of our invention is the manner of drying the gel and preparing it for commercial use. The sheet or sheets of vibrant gel are placed in or passed through a steam-heated drying oven provided with forced draft ventilation and during the initial stages of the drying the temperature of the gel should be within the approximate range of about 150 to 180° F., preferably 160 to 170° F. Such drying is continued until the weight of the gel has been decreased by 80 to 90% or until the analysis of the gel will show an alumina content of 20 to 60% or approximately 50%. With thin sheets this may require only a few hours but with sheets of the order of 1 inch in thickness 3 or 4 days may be required for this drying step. When the gel is dried in thin layers the resulting product is in the form of flakes while the drying of thicker layers results in a granular structure having a particle size of about 8 mesh and smaller. While the temperature during this initial drying stage must be maintained within the rather critical limits above stated during the main part of the drying step, this temperature may be increased after the bulk of the water removable by drying has been removed from the gel.

The oven-dried material is next placed in a closed vessel or chamber usually referred to as a "decarbonizer" wherein it is gradually heated to a temperature of about 950 to 1000° F. in the presence of an inert gas stream such as nitrogen, carbon dioxide or flue gas. The temperature rise in this dehydration and decarbonizing step should be relatively slow and uniform and it usually requires about 4 to 8 hours. Small amounts of air may be employed along with the inert gas for the controlled combustion of carbonaceous material or other combustible material but this combustion should be very carefully controlled and the temperature rise should be slow and gradual in order to produce a finished gel of desired physical and catalytic properties. At the end of this heat treating step combustible material will have been substantially eliminated from the gel. The gel prepared from the acetic acid sol may contain a substantial amount of acetic acid which must be removed in the drying and decarbonizing steps and this necessitates the combustion of about 2% of carbonaceous material from the gel. When formic acid is employed instead of acetic acid this heat treating or decarbonization step is enormously simplified because the formic acid is largely eliminated as carbon monoxide and water so that there is little or no likelihood of impairing the catalyst by too rapid a combustion of carbonaceous material.

The heat treatment and decarbonization of the gel does not produce a catalyst of maximum effectiveness and the next step of our process is therefore the calcining of the heat treated gel at a temperature of the order of about 1110° F. for a period of about 24 hours. In the calcining step it is not so important to control the amount of free oxygen in the heating gases because combustible material has already been substantially eliminated. The function of the calcining step is evidently to convert the resulting catalyst gel into a more active catalyst form. The calcining may be at higher temperatures, i. e., temperatures of the order of 1200 to 1400° F. for a correspondingly shorter period of time or it may be effected by heating at about 1000 to 1050° F. for a much longer period of time. In fact, the calcining of the catalyst may be effected in catalyst regenerations after the catalyst is placed on stream but in this case the initial activity of the catalyst will be lower than its activity after the regenerations required for obtaining the necessary calcining. The calcining step may be of longer duration than hereinabove indicated but at least 24 hours at about 1100° F. or the equivalent thereof is apparently the minimum for obtaining optimum catalyst activity.

After the calcining step (or after the decarbonizing step if calcination is effected by catalyst regenerations) the gel may be impregnated with further amounts of ammonium molybdate or with other catalyst material and subsequently heated to 1000° F. in a decomposer for removing any undesired components or materials introduced in the impregnation step. In our preferred process for making a catalyst for producing high octane number gasoline from ordinary naphthas, this subsequent impregnation step is unnecessary and even undesirable because it appears that the catalyst material impregnated onto the gel after the decarbonizing or calcining steps has a tendency to produce larger amounts of carbon than the catalyst material which is incorporated into the gel prior to gelation. However, the subsequent impregnation step may be desirable in specific instances where the carbon formation tendency is of minor importance. Subsequent impregnation will be found for example to result in a remarkable increase in toluene production from the aromatization of light naphthas of about 190 to 260° F. boiling range; about 25% more toluene can be obtained from such charging stock if molybdenum oxide is applied to the alumina gel after drying and decarbonization.

The catalyst which has been decarbonized and preferably calcined is still in the form of flakes or granules of irregular particle size and such catalyst cannot be effectively utilized for large commercial installations. In the first place this catalyst material will tend to pack and will result in enormous pressure drops across the reaction chamber. The packing of the catalyst in one portion of the chamber will lead to channeling in other portions of the chamber. The large catalyst granules or flakes do not possess the necessary physical strength to stand up in commercial operations. It was thought that such catalyst particles might be ball-milled and pelleted in accordance with known commercial methods but the pelleting of ball-milled catalyst was found to result in catalyst pellets of decreased activity and increased carbon-forming tendencies. This problem of making the catalyst suitable for use on a commercial scale was extremely vexatious and for a long time appeared to rule out any commercial application of our unique catalyst. After extended and comprehensive research, however, we discovered that the unique and valuable properties of the granular or flake catalysts could be retained and in some cases even improved by pelleting provided that the grinding or crushing of the catalyst prior to pelleting was carefully controlled to avoid any destruction of the basic gel structure and provided the material mixed with the ground or crushed catalyst for pelleting was carefully selected to avoid possibility of contaminants and to obtain the necessary pellet crushing strength.

For the pelleting of our ground or crushed catalyst we have found that the commercial pelleting agent Sterotex supplied in the form of a white powder when employed with a controlled amount of moisture in accordance with usual pelleting technique, resulted in pellets which not only possessed the desired physical strength but also retained all of the valuable properties of the granular or flake catalyst material. Other materials such as wood rosin, graphite and a mixture of flour with stearic acid may also be used. The pellet size may range from about $1/8$ to $3/8$ inch and is preferably about $1/4$ inch in diameter and height. The lateral crushing strength (with the cylindrical pellet lying on its side) should be at least 2 pounds in the case of $1/8$ inch pellets, at least about 10 pounds in the case of $1/4$ inch pellets and at least about 20 pounds in the case of $3/8$ inch pellets. The pellets are formed under sufficient pressure to produce this mechanical strength. We employ about 1 part of Sterotex to 5 to 15 parts of the ground or crushed catalyst granules or flakes in this pelleting operation and the Sterotex is subsequently burned out of the catalyst pellets in the reactor itself. While Sterotex is a preferred pelleting agent, it should be understood that our invention is not limited to this specific agent since other organic pelleting agents may be employed provided that they do not introduce any inorganic impurities and provided that they can be uniformly mixed with the ground or crushed catalyst to give a fluent mixture which can be readily handled by the pelleting machine. Examples of other pelleting agents include wood resin, ordinary flour or even graphite but superior results are obtained by the use of the commercial product Sterotex in the form of a fluent fine powder.

The discovery of a suitable pelleting agent did not solve the pelleting problem because the ball-milled catalyst pelleted with Sterotex did not exhibit the activity of unpelleted catalyst and resulted in greater carbon formation than that obtained with the unpelleted catalyst. After further research on this problem we discovered that if the catalyst flakes or granules were crushed or ground to a particle size of about 30 to 100 mesh with not more than about 50% of the particles passing a 100 mesh screen the resulting pellets exhibited all of the desired properties of the unpelleted catalyst and at the same time made possible the use of the catalyst in large commercial installations. The catalyst particles should substantially all pass a 30 mesh screen in order that they may be handled by the pelleting machine. Furthermore, larger granules or flakes do not result in pellets of the desired physical strength. Representative screen analyses have indicated that approximately 10% is retained on a 40 mesh screen, approximately 30% on a 60 mesh screen, approximately 15% on an 80 mesh screen, and approximately 10% on a 100 mesh screen, about half of the remainder being retained on a 200 mesh screen and the remainder passing a 200 mesh screen. When catalyst of such screen analyses is pelleted with a suitable organic binder in the presence of the required amount of moisture it appears that the pellets consist of cemented particles of various sizes each of which retains its initial gel structure. The larger catalyst particles are not crushed or destroyed in the pelleting step but the voids between the larger particles are filled with the smaller particles and the whole mass is apparently cemented together in a manner analogous to the cementing together of crushed rock, gravel and sand in a concrete mixture. The porosity of the larger catalyst particles evidently enables the entire pellet mass to be catalytically effective. Catalyst pellets prepared in the manner hereinabove described have been found to be superior to any catalyst of this type heretofore produced in the art, particularly for the production of high octane number gasoline from low octane number naphtha.

The catalyst of our invention is of the general type described in United States Patent 2,274,634 but its pelleted structure permits its use in large commercial installations and it is also improved by virtue of the particular method of preparation hereinabove set forth. The catalyst may be employed for making toluene from a light naphtha fraction boiling in the approximate range of 190 to 260° F. Thus a particular light M-C naphtha having an A. P. I. gravity of 61, an initial boiling point of 196° F., 10% point of 208° F., 50% point of 219° F., 90% point of 239° F., and end point of 258° F. was found on analysis to contain only 0.3% of benzene, 2.2% of toluene, 0.7% of xylenes, a total aromatic content of 3.2%. The naphthenes in this charge amounted to about 41% (including 13.1% of combined methyl hexane and ethyl cyclopentane) and the paraffins to about 55%. When this particular stock is contacted with a pelleted catalyst of the type hereinabove described (containing 6% of $MoO_3$) at a temperature of about 980° F., with a space velocity of about 1 volume of liquid of liquid charge per hour per volume of catalyst space in the presence of about 2500 cubic feet of hydrogen per barrel of stock charged, we obtain a liquid product yield upwards of 70% and a carbon deposit on the catalyst of only about .1% based on stock charged. The product has an A. S. T. M. octane number of 83.6, a Reid vapor pressure of 10.8 and an A. P. I. gravity of 53.5. The toluene production in this particular process is about 15.5% based on charging stock or about 22% based on liquid products, the toluene content of the 204° to 255° F. product cut being 70.6%. The above figures are based on an average of 8 runs and these figures clearly show not only the high yield and high octane number of the total liquid product together with the remarkably low carbon deposit on the catalyst but they also show that the catalyst is effective for producing large amounts of toluene which is now of vital importance in the war effort. By employing lower space velocities the product octane number and the toluene production may be still further increased—we can obtain octane numbers upwards of 90 and we can also obtain upwards of 90% of toluene in the so-called toluene cut from the liquid products. The catalyst is even more directive toward toluene production if it is impregnated with additional ammonium molybdate in the manner hereinabove described. Our catalyst is, however, perhaps most outstanding in the production of large yields of very high octane number gasoline from heavy naphthas and low octane number naphthas of relatively wide boiling range. For example, when a heavy naphtha having a boiling range from about 240 to 400° F. and an A. S. T. M. octane number of about 35 was contacted with ¼ inch pelleted catalysts of the type hereinabove described (6% $MoO_3$) under operating conditions of the previous example, we obtain about a 75% yield of a product of about 85.3 octane number and the carbonaceous deposit in this case is less than .4%. As compared with the granular catalyst containing 10% of $MoO_3$ in United States Patent 2,274,634, it will be noted that we obtain a remarkable increase in liquid yield and a remarkable decrease in carbon residue while employing approximately the same reaction conditions and obtaining approximately the same product knock rating.

In still another example using the same heavy naphtha charging stock but using ⅛ inch pelleted catalyst which has been subjected to extended calcining treatment at 1100° F., when the charging stock is contacted under approximately the same conditions as in the previous examples but at a space velocity of .64, we obtain a liquid yield of about 65% of a product having an octane number of about 90 to 91 and we obtain a carbon deposit of only about 1.0%. This example illustrates the remarkably high octane numbers obtainable by the use of our catalyst while at the same time producing large gasoline yields and a relatively small amount of carbonaceous deposit.

In these specific examples the temperature was about 980° F. but it should be understood that temperatures within the approximate range of 900 to 1050° F. may be used; the pressure was approximately 200 pounds per square inch but pressures within the range of 50 to 400 pounds per square inch may be used; the space velocities were about 1 but space velocities ranging from about .1 to 2 or more may be used. Hydrogen was employed at the rate of about 2500 cubic feet per barrel of stock charged but the amount of hydrogen may vary from about 1000 to 5000 cubic feet per barrel of stock charged. The on-stream period in the above examples was approximately 6 hours but on-stream periods may range from about 1 to 12 hours. For obtaining maximum octane numbers or maximum amounts of toluene in the toluene fraction, space velocities should preferably be less than 1 although generally speaking we may employ much higher space velocities with our improved catalysts than can possibly be used with the present known commercial catalysts without sacrificing yields or octane number improvement and we will obtain even a less amount of carbonaceous deposit at a given conversion than is obtained in any known commercial catalyst heretofore used for this purpose.

While we have described the use of our improved catalyst for dehydrogenating and aromatizing naphtha fractions it should be understood that our catalysts may be employed for other hydrocarbon conversion processes. If the catalyst is to be used for cracking a gas oil or heavier hydrocarbon we may add silica sol or silica gel prior to gelation or we may introduce other known cracking catalysts as hereinabove described. Similarly we may introduce catalyst for promoting polymerization, alkylation, reforming, etc. The catalysts thus prepared for these various processes will be employed in systems and under conditions corresponding in general to systems heretofore employed for those processes and further description of the use of our catalysts, therefore, appear to be unnecessary.

Our pelleted catalysts are of primary importance in fixed bed catalyst systems but they may be employed in moving bed systems. In the powdered or fluid type systems the pelleted step is of course unnecessary but other features of our invention are nevertheless applicable. Our invention is not limited to any particular type of conversion system nor is it limited to the specific examples hereinabove set forth since numerous modifications and alternative procedural steps and operating conditions will be apparent from the above description to those skilled in the art.

We claim:

1. The method of converting hydrocarbon oils which comprises subjecting said oils under conversion conditions to the action of a solid catalyst prepared by reacting amalgamated aluminum with hot water in the presence of a peptizing agent comprising a dilute organic acid under conditions to form an alumina sol containing an amount of alumina within the approximate range of 3% to 8%, incorporating a catalyst material in said sol immediately prior to gelation, gelling a thin layer of said sol with incorporated catalyst material prior to dehydration, drying said gel at a temperature substantially below the boiling point of water until the bulk of the water has been removed therefrom, then subjecting the dried gel to heat treating, dehydration and decarbonization by slowly and gradually increasing its temperature while maintaining it in a closed treating zone and passing a hot inert gas through said treating zone together with regulated amounts of oxygen under conditions for substantially dehydrating said gel and burning combustible materials therefrom without deleteriously affecting the gel structure and finally calcining the dehydrated gel for an extended period of time at a higher temperature than that to which the catalyst is to be subjected in the conversion step.

2. The method of claim 1 wherein the peptizing agent is formic acid, wherein the initial concentration of the formic acid for forming the alumina sol is within the approximate range of ½ to 2% and wherein additional formic acid is added as the reaction proceeds so that the final formic acid concentration is within the approximate range of 2 to 9%.

3. The method of claim 1 wherein the initial drying step is effected within the approximate temperature range of 150 to 180° F., wherein the heat treating step for dehydration and decarbonization is prolonged for at least several hours during which the temperature of the dried catalyst is increased to a point within the general vicinity of about 1000° F. and wherein the calcining step amounts to a heat treatment at a temperature in the general vicinity of about 1100° F. for a period of at least about 24 hours.

4. The method of claim 1 wherein the preparation of the catalyst includes the further step of crushing dried catalyst to such an extent that substantially all of the crushed catalyst particles will pass a 30 mesh screen and at least about 50% of the crushed catalyst will be retained on a 100 mesh screen and pelleting the crushed catalyst with an organic pelleting agent to produce pellets of about ⅛ to about ⅜ inch having a lateral crushing strength of at least about 2 pounds for the ⅛ inch pellets to at least about 20 pounds for the ⅜ inch pellets.

5. The method of converting hydrocarbon oils which comprises subjecting said oils under conversion conditions to the action of a solid catalyst prepared by reacting amalgamated aluminum with water in the presence of a peptizing agent of the class consisting of formic acid and acetic acid at a temperature substantially above 160° F. with rapid stirring, beginning said reactions with an acid concentration in the general vicinity of 1%, increasing the acid concentration as the reaction proceeds until an acid concentration is reached which will permit the formation of a sol having an alumina content within the approximate range of 3 to 8%, continuing the stirring at said high temperature until a sol of said alumina content is obtained, separating the resulting sol from mercury and undissolved aluminum, gelling said separated sol in thin layers, drying said gel, heat treating said dried gel by slowly increasing its temperature up to about 950 to 1000° F. while passing an inert gas therethrough and calcining the heat treated gel at a temperature higher than 1000° F. for a period of at least 24 hours.

6. The method of claim 5 wherein the acid is formic acid and wherein the final acid concentration of the alumina sol prior to gelation is within the approximate range of 3 to 6% whereby the resulting gel may be converted into the sol state by mechanical mixing and whereby the acid may be decomposed into carbon monoxide and steam in the heat treating step and thus eliminated from the dried gel.

7. The method of claim 5 wherein the concentration of acid peptizing agent and the duration of the reaction between amalgamated aluminum and water is so regulated as to obtain a sol having an alumina content of about 5 to 6%.

8. The method of claim 5 which includes the step of introducing regulated amounts of oxygen along with the inert gas in the heat treatment for burning carbonaceous deposits resulting from the occlusion of peptizing agent in the gel while preventing such rapid combustion as would deleteriously affect the gel structure.

9. The method of converting hydrocarbon oils which comprises subjecting said oils under conversion conditions to the action of a solid catalyst prepared by reacting amalgamated aluminum with water in the presence of a peptizing agent comprising a dilute organic acid under conditions to form an alumina sol containing an amount of alumina within the approximate range of 3% to 8%, separating the resulting sol from mercury and undissolved alumina, gelling said sol, drying said gel at a temperature below the boiling point of water until the bulk of the water has been removed therefrom, then subjecting the dried gel to heat treating, dehydration and decarbonization by slowly increasing its temperature while maintaining it in a closed treating zone and passing a gas therethrough and thereafter calcining said gel at a temperature and for a period of time corresponding to calcination at 1100° F. for a period of at least 24 hours.

10. The method of converting hydrocarbon oils which comprises subjecting said oils under conversion conditions to the action of a solid catalyst prepared by reacting amalgamated aluminum with water in the presence of a peptizing agent comprising a dilute organic acid under conditions to form an alumina sol containing an amount of alumina within the approximate range of 3% to 8%, separating the resulting sol from mercury and undissolved alumina, gelling said sol, drying said gel at a temperature below the boiling point of water until the bulk of the water has been removed therefrom whereby a dried gel is produced which contains decomposable organic material, subjecting said dried gel containing decomposable material to a heat treatment for a period of at least several hours by continuously passing a hot inert gas through said catalyst while gradually and slowly increasing the temperature of said catalyst from 950 to 1000° F. and regulating the oxygen concentration in said inert gas to prevent such rapid decomposition or combustion as to deleteriously affect the gel structure.

LLEWELLYN HEARD.
RODNEY V. SHANKLAND.
JAMES C. BAILIE.